United States Patent
Ushikubo

(10) Patent No.: US 10,691,381 B2
(45) Date of Patent: Jun. 23, 2020

(54) IMAGE FORMING APPARATUS AND BACKUP SYSTEM

(71) Applicant: Oki Data Corporation, Tokyo (JP)

(72) Inventor: Yuichi Ushikubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/251,208

(22) Filed: Jan. 18, 2019

(65) Prior Publication Data

US 2019/0235807 A1 Aug. 1, 2019

(30) Foreign Application Priority Data

Jan. 29, 2018 (JP) .................................. 2018-012139

(51) Int. Cl.
*G06F 3/12* (2006.01)

(52) U.S. Cl.
CPC ............ *G06F 3/1225* (2013.01); *G06F 3/122* (2013.01); *G06F 3/1253* (2013.01)

(58) Field of Classification Search
CPC ........ G06F 3/121; G06F 3/1225; G06F 3/122; G06F 3/1253; G06F 3/1231; G06F 3/123; G06K 15/40; H04L 67/1097; H04L 67/1095
USPC ....................................................... 358/1.15
See application file for complete search history.

(56) References Cited

U.S. PATENT DOCUMENTS

| | | | |
|---|---|---|---|
| 2009/0046686 A1* | 2/2009 | Izaki ...................... | H04W 8/20 370/338 |
| 2009/0195821 A1* | 8/2009 | Matoba ................. | H04N 1/0032 358/1.15 |
| 2012/0327442 A1* | 12/2012 | Nakahara ................ | G06F 13/12 358/1.13 |
| 2013/0155451 A1* | 6/2013 | Nakahara .............. | G06F 3/1204 358/1.15 |
| 2018/0143767 A1* | 5/2018 | Sugimoto ............. | G06F 3/0619 |
| 2018/0267864 A1* | 9/2018 | Michishita .......... | G06F 11/1469 |

FOREIGN PATENT DOCUMENTS

JP        2016105646 A        6/2016

* cited by examiner

*Primary Examiner* — Gabriel I Garcia

(74) *Attorney, Agent, or Firm* — Pantich Schwarze Belisario & Nadel LLP

(57) ABSTRACT

An image forming apparatus includes: a storage section (118) that stores apparatus setting information including a plurality of setting values corresponding to a plurality of setting items in the image forming apparatus; a backup setting generation section (115) that generates a BSF including a setting value extracted from the apparatus setting information and first identification information assigned to the image forming apparatus in a network; a backup setting control section (114) that sends the generated BSF to another printer (110) and receives the BSF from the another printer (110); and a backup setting update section (117) that specifies a setting value that is able to be set in the image forming apparatus and updates a setting value included in the apparatus setting information to the specified setting value.

15 Claims, 11 Drawing Sheets

FIG. 7

| ITEM | VALUE |
|---|---|
| GENERATION DATE | 2017/9/19 16:17 |
| MODEL NAME | C832 |
| IP ADDRESS | 192.168.100.1 |
| MAC ADDRESS | 00:25:36:AE:D4:1A |
| TRAY 1: SHEET SIZE | A4 |
| TRAY 1: SHEET TYPE | RECYCLED PAPER |
| TRAY 2: SHEET SIZE | A3 |
| TRAY 2: SHEET TYPE | PLAIN PAPER |
| TONER SAVE | MIDDLE |

FIG. 12A

| ITEM | VALUE |
| --- | --- |
| TRAY 1: SHEET SIZE | A4 |
| TRAY 1: SHEET TYPE | PLAIN PAPER |
| TONER SAVE | OFF |

FIG. 12B

| ITEM | VALUE |
| --- | --- |
| TRAY 1: SHEET SIZE | A4 |
| TRAY 1: SHEET TYPE | RECYCLED PAPER |
| TONER SAVE | OFF | though # IMAGE FORMING APPARATUS AND BACKUP SYSTEM

CROSS-REFERENCE TO RELATED APPLICATION

This application claims priority under 35 U.S.C. § 119(b) to Japanese Application No. 2018-012139, filed Jan. 29, 2018, the disclosure of which is incorporated by reference herein in its entirety.

BACKGROUND OF THE INVENTION

1. Field of the Invention

The present invention relates to an image forming apparatus and a backup system.

2. Description of the Related Art

For a conventional image forming apparatus such as a printer or a multi-function peripheral, Nakahara discloses, in Japanese Patent Application Publication No. 2016-105646, a technique with which apparatus setting information is automatically backed up to an in-house server or a cloud server and, in replacing the image forming apparatus by another image forming apparatus, this backed-up setting is reflected on the replaced image forming apparatus.

SUMMARY OF THE INVENTION

However, when the in-house server or the cloud server is used for backup of settings, it is necessary to pay costs for maintaining the server.

In view of the above, one or more aspects of the present invention provide an object of easily taking over settings with reduced use of the server in replacing image forming apparatuses.

An image forming apparatus according to an aspect of the present invention is an image forming apparatus connected to a network to which another image forming apparatus is connected. The image forming apparatus includes: a network communication section that communicates with the network; a storage section that stores apparatus setting information including a plurality of setting values corresponding to a plurality of setting items in the image forming apparatus; a backup setting generation section that extracts a setting value corresponding to a predetermined setting item from the apparatus setting information, and generates a first backup setting file including the extracted setting value and first identification information assigned to the image forming apparatus in the network, the extracted setting value being associated with the first identification information in the first backup setting file; a backup setting control section that includes a unit for sending the first backup setting file to the another image forming apparatus through the network communication section and a unit for receiving a first backup setting file including the first identification information from the another image forming apparatus through the network communication section; and a backup setting update section that specifies a setting value that is able to be set in the image forming apparatus from the received first backup setting file, and updates a setting value corresponding to the specified setting value in the plurality of setting values included in the apparatus setting information to the specified setting value.

A backup system according to an aspect of the present invention is a backup system constituted by a plurality of image forming apparatuses connected to a network. Each of the plurality of image forming apparatuses includes: a network communication section that communicates with the network; a storage section that stores apparatus setting information including a plurality of setting values corresponding to a plurality of setting items in its own image forming apparatus; a backup setting generation section that extracts a setting value corresponding to a predetermined setting item from the apparatus setting information, and generates a first backup setting file including the extracted setting value and first identification information assigned to its own image forming apparatus in the network, the extracted setting value being associated with the first identification information in the first backup setting file; a backup setting control section that includes a unit for sending the first backup setting file to the plurality of image forming apparatuses except its own image forming apparatus through the network communication section and a unit for receiving a first backup setting file including the first identification information from the plurality of image forming apparatuses except its own image forming apparatus through the network communication section; and a backup setting update section that specifies a setting value that is able to be set in its own image forming apparatus from the received first backup setting file, and updates a setting value corresponding to the specified setting value in the plurality of setting values included in the apparatus setting information to the specified setting value.

In one or more aspects of the present invention, settings can be easily taken over in replacing image forming apparatuses even with reduced use of a server.

BRIEF DESCRIPTION OF THE DRAWINGS

In the attached drawings:

FIG. 7 is a schematic diagram illustrating an example of a backup setting;

FIGS. 12A and 12B are schematic diagrams showing apparatus setting information before and after takeover in a case where a setting value is taken over using backup settings in the printer.

DETAILED DESCRIPTION OF THE INVENTION

Figure 1:
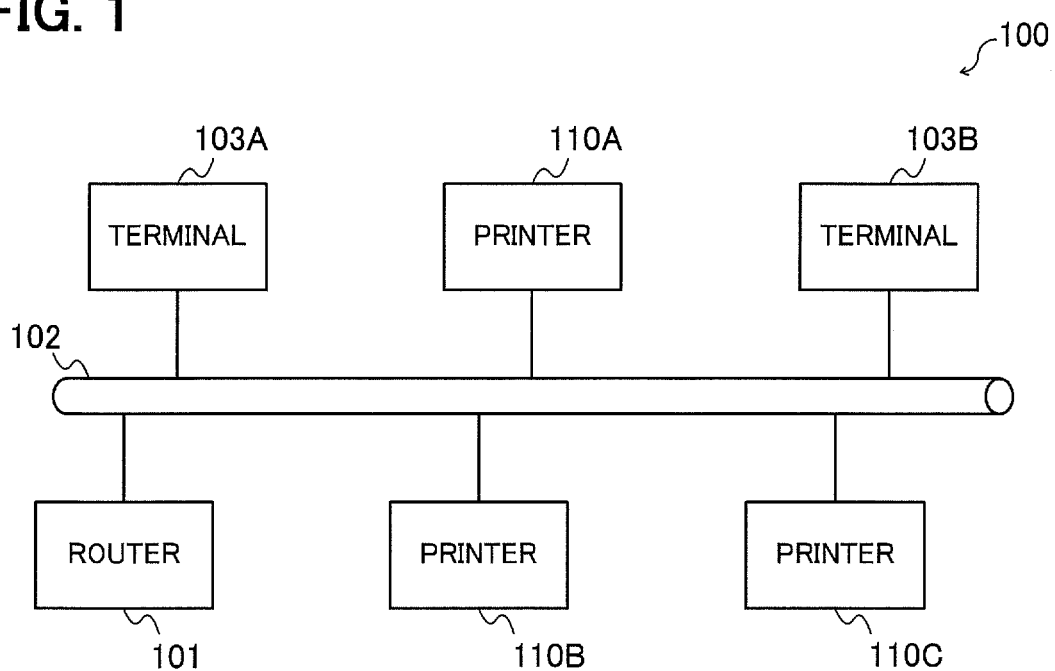
FIG. 1 is a block diagram schematically illustrating a configuration of a backup system.

FIG. 1 is a block diagram schematically illustrating a configuration of a backup system 100 according to an embodiment.

The backup system 100 includes a plurality of printers 110A, 110B, 110C that are a plurality of image forming apparatuses.

The plurality of printers 110A, 110B, 110C may have differences in printing functions as image forming functions, but have similar backup functions. Thus, when it is not necessary to specifically distinguish each of the plurality of printers 110A, 110B, 110C, these printers will be referred to as a printer 110. It is assumed that each of the printer 110A, the printer 110B, and the printer 110C has a tray 1 and a tray 2 as paper trays.

The printer 110 is connected to a network 102 including a router 101. The network 102 is, for example, a local area network (LAN).

Terminals 103A, 103B are also connected to the network 102. The printer 110 executes printing (image formation) in accordance with print data that is image formation data sent from the terminals 103A, 103B.

The terminals 103A, 103B are personal computers that operate on a versatile operating system (OS) such as Windows (registered trademark).

The printer 110A is assigned with "192.168.100.1" as an Internet protocol (IP) address, for example. The printer 110B is assigned with "192.168.100.2" as an IP address, for example. The printer 110C is assigned with "192.168.100.3" as an IP address, for example.

It is assumed that the IP address assigned to the printer 110 is fixed and the IP addresses of the terminals 103A, 103B are automatically assigned by the router 101.

Figure 2:
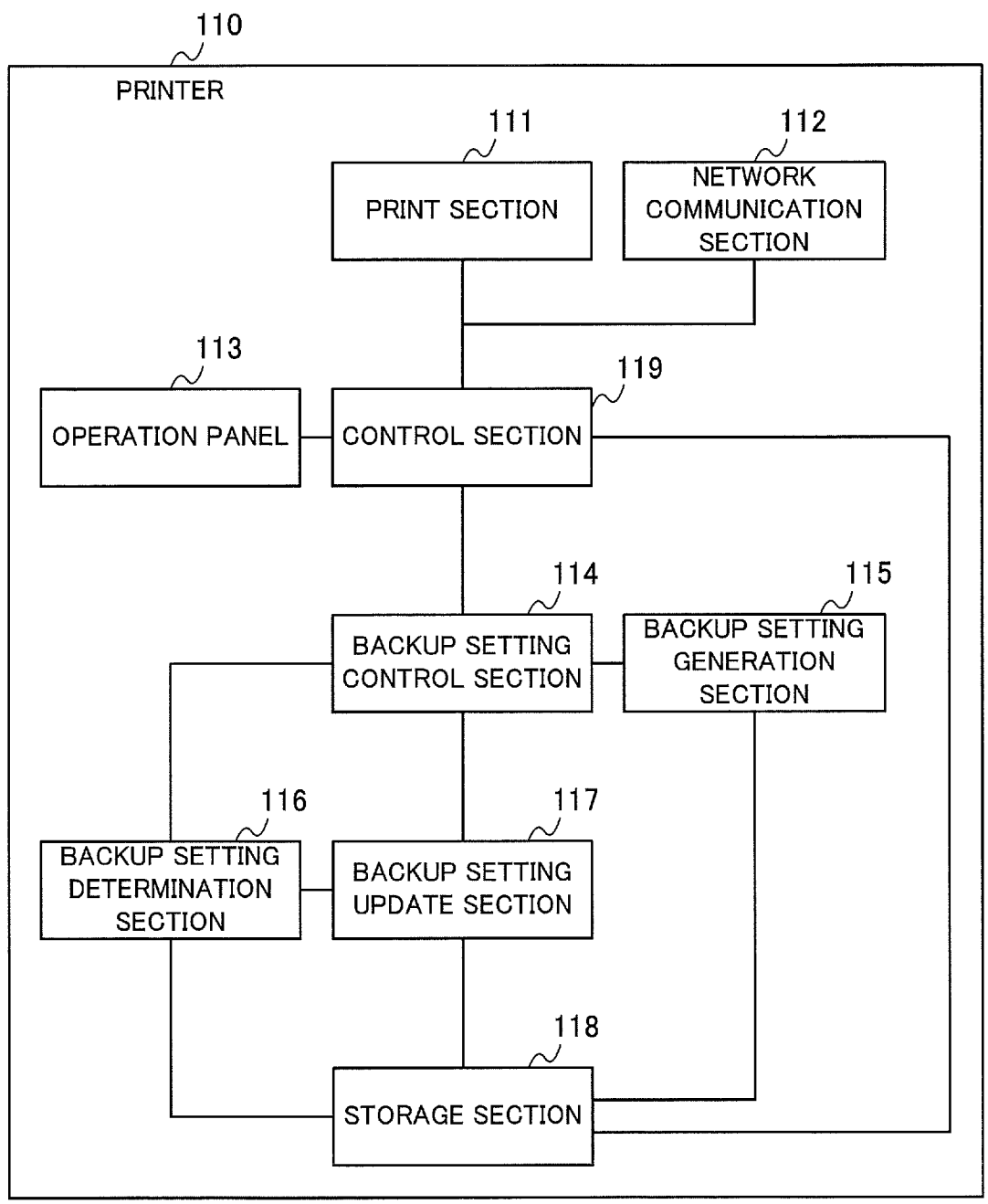
FIG. 2 is a block diagram schematically illustrating a configuration of a printer.

FIG. 2 is a block diagram schematically illustrating a configuration of the printer 110.

The printer 110 includes a print section 111, a network communication section 112, an operation panel 113, a backup setting control section 114, a backup setting generation section 115, a backup setting determination section 116, a backup setting update section 117, a storage section 118, and a control section 119.

The print section 111 is an image forming section that executes a printing function of forming an image on a medium. The printers 110A, 110B, 110C may be different from one another as a specific configuration of the print section 111. For example, the printers 110A, 110B, 110C may be different in the number of paper trays, the size of paper sheets which are usable, the content of a toner save function for saving a toner as a developer, or the presence or absence of correspondence to color printing, for example. A plurality of setting values corresponding to a plurality of setting items can be set in the print section 111, and the printing function is executed according to the set setting value.

The network communication section 112 communicates with the network 102. The network communication section 112 can be implemented by a network interface card (NIC), for example.

The operation panel 113 functions as a display section that displays various screen images and an input section that receives various inputs such as a setting change. The operation panel 113 can be implemented by a touch screen, for example.

The backup setting control section 114 controls a backup process of apparatus setting information (described later) in the printer 110. For example, the backup setting control section 114 includes a unit for sending a backup setting file (hereinafter referred to as a BSF) generated in its own apparatus to another printer 110 through the network communication section 112. The BSF will be described later.

The backup setting control section 114 includes a unit for receiving a BSF from another printer 110 through the network communication section 112. In the case where the backup setting control section 114 receives the BSF from another printer 110 through the network communication section 112, the backup setting control section 114 causes the storage section 118 to store the BSF. In addition, in a case where the backup setting control section 114 receives, from another printer 110, a confirmation request (BSF confirmation request) including an IP address of this printer 110 through the network communication section 112, the backup setting control section 114 finds a BSF including this IP address in the storage section 118, and sends a generation date of the found BSF to the printer 110 through the network communication section 112. Furthermore, in a case where the backup setting control section 114 receives, from another printer 110, a transmission request (BSF transmission request) including an IP address of this printer 110, the backup setting control section 114 reads out a BSF including this IP address from the storage section 118, and sends the BSF to the printer 110 through the network communication section 112.

The backup setting generation section 115 generates a BSF for backup of apparatus setting information. For example, the backup setting generation section 115 extracts setting a value corresponding to a predetermined setting item from the apparatus setting information stored in the storage section 118, and generates a BSF in which the extracted setting value is associated with identification information (IP address) assigned to its own apparatus in the network 102. The generated BSF is sent to another printer 110 by the backup setting control section 114 through the network communication section 112.

In a case where another printer 110 stores a plurality of BSFs applicable to its own apparatus, the backup setting determination section 116 determines a BFS to be used in its own apparatus. For example, the backup setting determination section 116 determines a BSF including a latest generation date as the BSF to be used. The generation date of a BSF is acquired from another printer 110 by the backup setting control section 114 sending a confirmation request (BSF confirmation request) including an IP address assigned to its own apparatus to another printer 110 through the network communication section 112. The BSF determined by the backup setting determination section 116 is acquired from the printer 110 by the backup setting control section 114 sending a transmission request (BSF transmission request) to the printer 110 storing this BSF through the network communication section 112.

The backup setting update section 117 interprets a BSF acquired from another printer 110, specifies a setting value which is able to be set in its own apparatus, and updates a setting value included in apparatus setting information of its own apparatus to the specified setting value. For example, the backup setting update section 117 specifies, as the setting value which is able to be set in its own apparatus, a setting value that corresponds to any one of a plurality of setting items included in apparatus setting information of its own apparatus and can be set to the corresponding items, among setting values included in the BSF acquired from another printer 110.

The storage section 118 stores information necessary for processing in the printer 110. For example, the storage section 118 stores apparatus setting information including a plurality of setting values corresponding to a plurality of setting items in its own apparatus, and stores a BSF sent from another printer 110. The setting items included in the apparatus setting information may be relevant to the print section 111 or to another section. The storage section 118 temporarily stores a BSF generated by its own apparatus.

A BSF including the same IP address as that of its own apparatus will be also referred to as a first BSF, and a BSF including an IP address of another printer 110 will be also referred to as a second BSF.

The storage section 118 can be implemented by, for example, a volatile or nonvolatile memory or a storage device such as a hard disk drive (HDD). For example, the printer 110 may include both a volatile memory and either a nonvolatile memory or an HDD. In this case, the volatile memory may store a BSF including an IP address assigned to its own apparatus and the nonvolatile memory or the HDD may store a BSF including an IP address assigned to another printer 110.

The control section 119 controls overall processing in the printer 110.

Figure 3A:
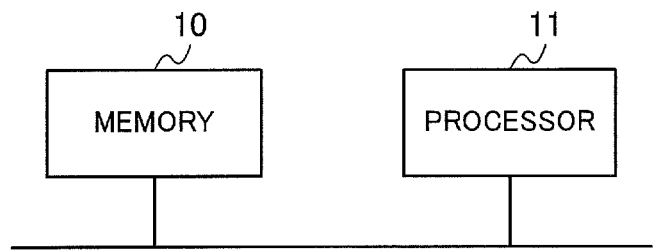
FIGS. 3A and 3B are block diagrams illustrating hardware configuration examples.

A part or whole of the backup setting control section 114, the backup setting generation section 115, the backup setting determination section 116, the backup setting update section 117, and the control section 119 described above can be constituted by a memory 10 and a processor 11 such as a central processing unit (CPU) that executes a program stored in the memory 10, as illustrated in FIG. 3A, for example. Such a program may be provided through the network or may be provided by storing the program on a recording medium. That is, such a program may be provided as, for example, a program product.

Figure 3B:
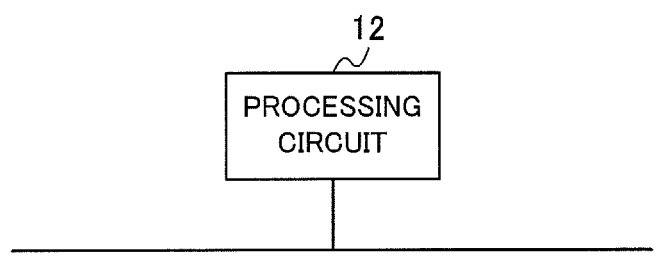

A part or whole of the backup setting control section 114, the backup setting generation section 115, the backup setting determination section 116, the backup setting update section 117, and the control section 119 may be constituted by a processing circuit 12 such as a single circuit, a combined circuit, a programmed processor, a parallel-programmed processor, an application specific integrated circuit (ASIC), or a field programmable gate array (FPGA), as illustrated in FIG. 3B, for example.

Next, an operation in the backup system 100 will be described.

Here, as illustrated in FIG. 1, description will be given on the assumption that in the backup system 100 constituted by the printers 110A, 110B, 110C, the printer 110A is replaced by another printer 110. Specifically, as exemplified by a backup system 100# illustrated in FIG. 4, the printer 110A is replaced by the printer 110D in the following description.

Here, it is assumed that the printer 110D is also configured as illustrated in FIG. 2. The printer 110A includes the tray 1 and the tray 2 as paper trays, whereas the printer 110D includes only the tray 1 as a paper tray. As the toner save function, the toner save amount in the printer 110A can be set in four levels of "large," "middle," "small," and "none," whereas the toner save amount in the printer 110D can be set only in two levels of "ON" and "OFF."

It is assumed that the printer 110D is assigned with an IP address "192.168.100.1," which is the same as that of the printer 110A.

Figure 5:
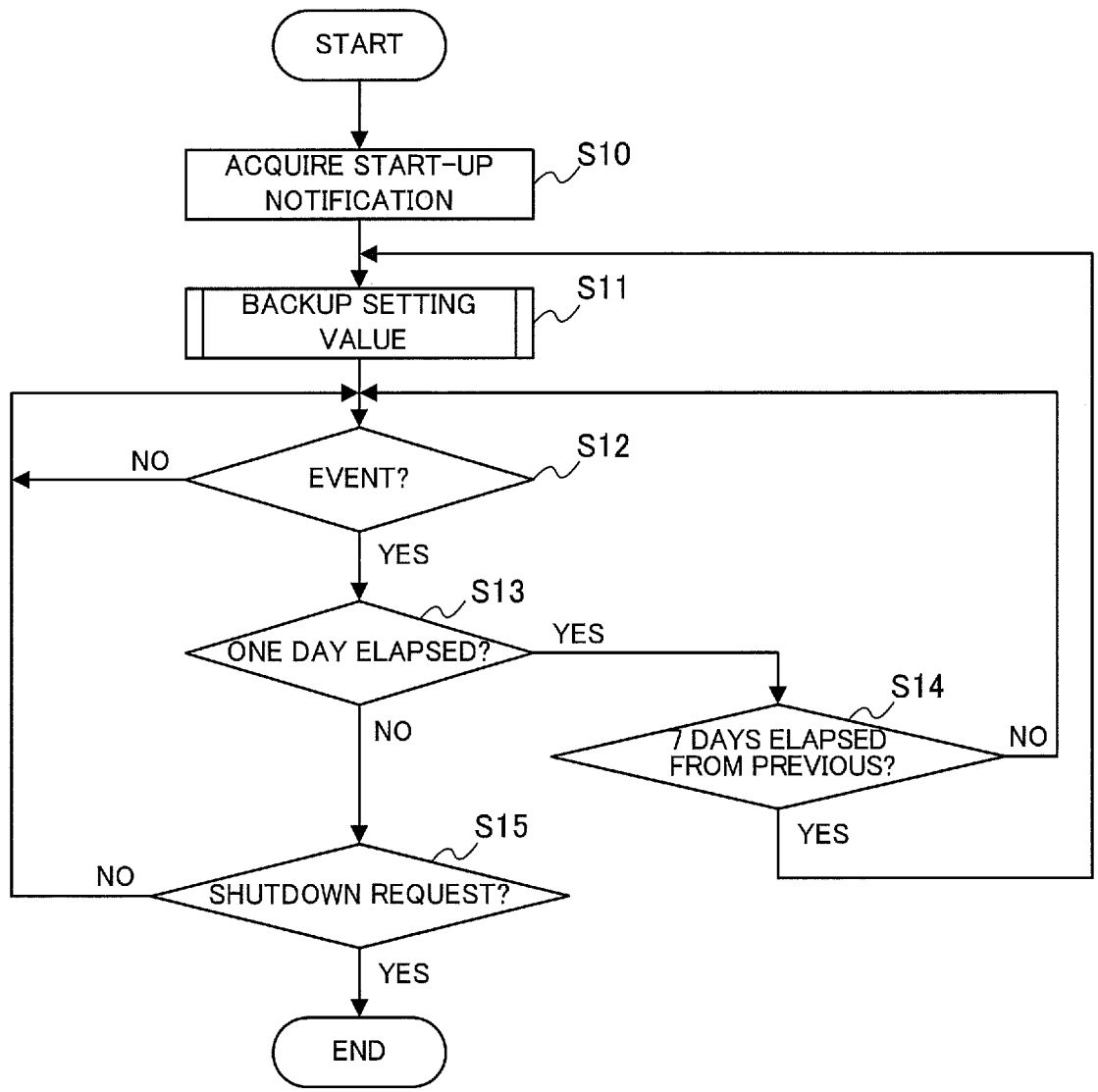
FIG. 5 is a flowchart depicting a backup continuation process in the printer.

FIG. 5 is a flowchart depicting a backup continuation process in the printer 110.

For example, the backup continuation process depicted in FIG. 5 is a process that is continuously performed by the backup setting control section 114 of the printer 110 connected to the network 102.

First, when the printer 110 starts up, the backup setting control section 114 receives a start-up notification from the control section 119 (S10). Accordingly, the backup setting control section 114 recognizes that the printer 110 has started up.

Thereafter, the backup setting control section 114 performs a backup process of apparatus setting information of the printer 110 (S11). This process will be described in detail with reference to FIG. 6.

When the backup process has completed, the backup setting control section 114 enters an event monitoring state (S12). Here, the backup setting control section 114 waits for an event notification from the control section 119. If the event notification is issued (Yes in S12), the process proceeds to step S13.

In step S13, the backup setting control section 114 determines whether the event notification indicates a one-day elapsed event or not. The one-day elapsed event notifies that one day has elapsed from notification of the previous one-day elapsed event. If the event notification indicates a one-day elapsed event (Yes in S13), the process proceeds to step S14. If the event notification indicates another event (No in S13), the process proceeds to step S15.

In step S14, the backup setting control section 114 determines whether seven days have elapsed from the previous backup or not. If seven days have elapsed (Yes in S14), the process returns to step S11, and backup process is performed. If seven days have not elapsed, the process returns to step S12, and the backup setting control section 114 returns to the event monitoring state.

In step S15, the backup setting control section 114 determines whether the event notification indicates a shutdown request or not. If the event notification indicates a shutdown request (Yes in S15), the process is finished. If the event notification does not indicate a shutdown request (No in S15), the process returns to step S12, and the backup setting control section 114 returns to the event monitoring state.

Through the foregoing process, the backup setting control section 114 can perform backup of apparatus setting information of the printer 110 regularly.

Figure 6:
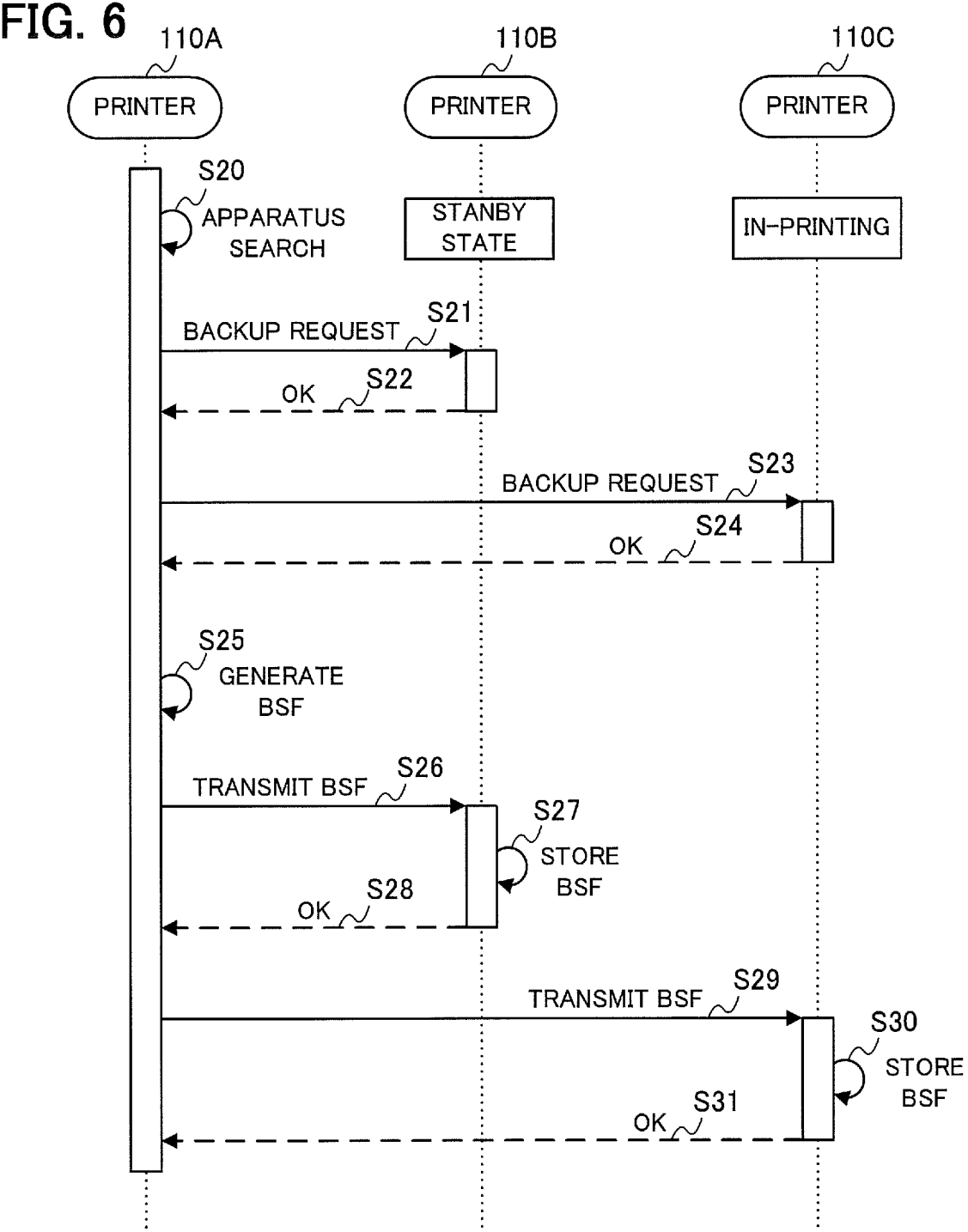
FIG. 6 is a sequence diagram showing a backup process of apparatus setting information in the printer.

FIG. 6 is a sequence diagram showing a backup process of apparatus setting information in the printer 110.

FIG. 6 is directed to a case where the printer 110A illustrated in FIG. 2 executes a backup process.

The backup setting control section 114 of the printer 110A searches the network 102 for the printer 110 that can be backed up, through the network communication section 112 (S20). For example, the backup setting control section 114 causes the network communication section 112 to transmit a predetermined request (e.g., a backup response request) by broadcast, thereby searching for the printer 110 that can be backed up. In the printer 110 that has received such a request, the backup setting control section 114 performs a predetermined response (e.g., a backup response) to a transmission source through the network communication section 112. Here, it is assumed that the printer 110B in a standby state and the printer 110C under printing are found.

Next, the backup setting control section 114 of the printer 110A sends a backup request to the found printer 110B through the network communication section 112 (S21).

The backup setting control section 114 of the printer 110B that has received such a request makes a response indicating OK as a success response indicating that the printer 110B accepts the backup request, through the network communication section 112 (S22).

Similarly, the backup request is also sent to the printer 110C (S23), and a response indicating OK is made by the printer 110C (S24).

The order of sending the backup requests is not limited to the order described above.

Thereafter, in the printer 110A that has received the response indicating OK, the backup setting-generation section 115 refers to the apparatus setting information stored in the storage section 118 to generate a BSF, and causes the storage section 118 to store the BSF (S25).

After the BSF is generated, the backup setting control section 114 of the printer 110A sends the BSF to the printer 110B through the network communication section 112 (S26).

In the printer 110B that has received the BSF, the backup setting control section 114 causes the storage section 118 to store the BSF (S27). After storage of the BSF has been completed, the backup setting control section 114 makes a response indicating OK to the printer 110A through the network communication section 112 (S28).

Similarly, the backup setting control section 114 of the printer 110A sends the BSF to the printer 110C through the network communication section 112 (S29).

In the printer 110C that has received the BSF, the backup setting control section 114 causes the storage section 118 to store the BSF (S30). After storage of the BSF has been completed, the backup setting control section 114 makes a response indicating OK to the printer 110A through the network communication section 112 (S31).

In the manner described above, the printer 110A sends the BSF to all the other printers 110B, 110C connected to the network 102 to cause the printers to back up the BSF.

FIG. 7 is a schematic diagram showing an example of a BSF.

A BSF 104 shown in FIG. 7 is information in a table format having an item column 104a and a value column 104b.

Each row of the item column 104a stores a setting item name that is setting item identification information for identifying a setting item of apparatus setting information.

Each row of the value column 104b stores a setting value of a setting item indicated by a setting item name stored in the item column 104a in the same row.

Specifically, the BSF 104 includes a row 104c that stores a generation date, a row 104d that stores a model name, a row 104e that stores an IP address, a row 104f that stores a MAC address, a row 104g that stores a sheet size of the tray 1, a row 104h that stores a sheet type of the tray 1, a row 104i that stores a sheet size of the tray 2, a row 104j that stores a sheet type of the tray 2, and a row 104k that stores a toner save setting.

The row 104c stores a date when the BSF 104 is generated. For example, the backup setting generation section 115 stores a date of generation of the BSF 104 in the row 104c.

The row 104d stores a model name of the printer 110.

The row 104e stores an IP address assigned to the printer 110. Here, the IP address functions as identification information assigned in the network 102 in order to identify the printer 110. An IP address assigned to its own apparatus will be also referred to as first identification information, whereas an IP address assigned to the other printers 110 will be also referred to as second identification information.

The row 104f stores a MAC address assigned to the network communication section 112 of the printer 110.

The storage section 118 of the printer 110 stores a model name, an IP address, and a MAC address. The backup setting generation section 115 refers to the data of these items stored in the storage section 118 to store values corresponding to the row 104d through the row 104f.

The row 104g stores a sheet size of sheets contained in the tray 1 provided in the printer 110.

The row 104h stores a sheet type of sheets contained in the tray 1.

The row 104i stores a sheet size of sheets contained in the tray 2 provided in the printer 110.

The row 104j stores a sheet type of sheets contained in the tray 2.

The row 104k stores a setting value (toner save setting) of the toner save function of the printer 110.

Here, the backup setting generation section 115 only needs to specify setting items previously determined as setting items to be backed up from the apparatus setting information stored in the storage section 118, read out setting values of the specified setting items, generate corresponding rows in the BSF 104, and store the read-out setting values in the generated rows.

Figure 8:
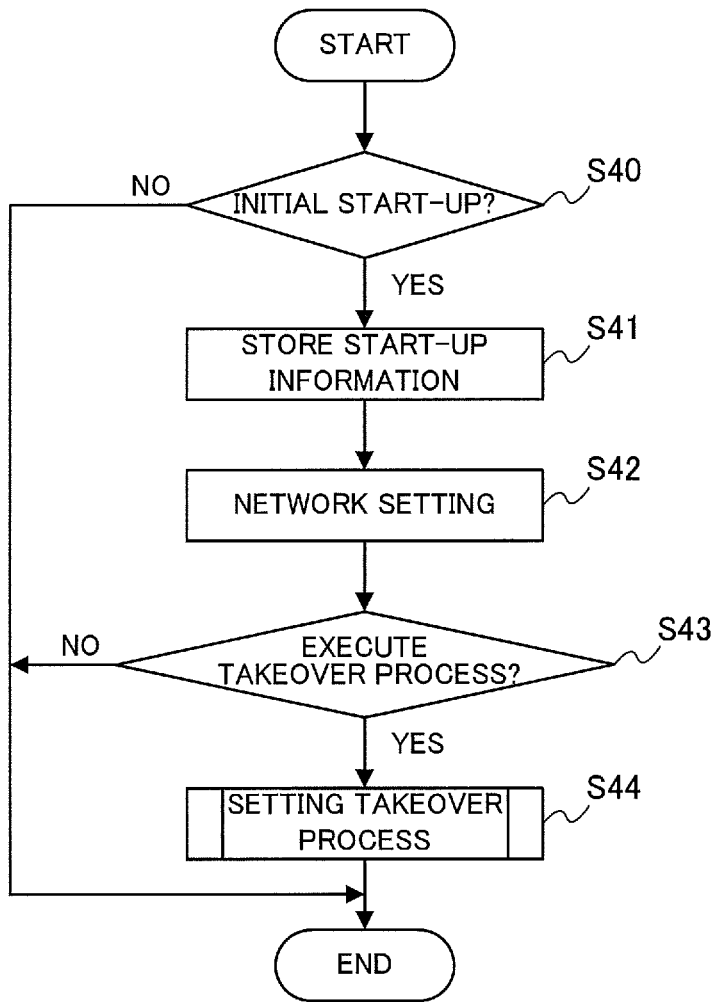
FIG. 8 is a flowchart depicting a process at start-up of the printer.

FIG. 8 is a flowchart depicting a process at start-up of the printer 110.

First, in the case of starting the printer 110, the control section 119 determines whether this start-up is the first time or not, by referring to information stored in the storage section 118 (S40). For example, the control section 119 determines whether start-up information described later is stored in the storage section 118 or not, in order to determine whether the start-up is the first time or not.

If the start-up is the first time (Yes in S40), the process proceeds to step S41. If the start-up is not the first time (No in S40), the process is finished.

In step S41, the control section 119 causes the storage section 118 to store start-up information indicating that the printer 110 has been started up.

Next, the control section 119 causes the operation panel 113 to display a screen image for receiving a setting for connection to the network 102, and receives a setting from a user (S42).

When a connection setting to the network 102 is completed, the control section 119 determines whether to execute a setting takeover process or not (S43). For example, the control section 119 causes the operation panel 113 to display a screen image for inquiring about whether to execute a setting takeover process or not, and receives an input on whether to execute the setting takeover process from the user. If the setting takeover process is to be executed (Yes in S43), the process proceeds to step S44. If the setting takeover process is not to be executed (No in S43), the process is finished.

In step S44, the backup setting determination section 116 and the backup setting update section 117 execute a setting takeover process. This process will be described with reference to FIG. 10.

FIGS. 9A to 9J are transition diagrams of screen images displayed on the operation panel 113 at initial start-up of the printer 110.

Figure 9A:
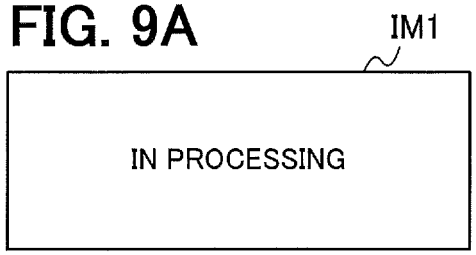
FIGS. 9A to 9J are transition diagrams of screen images displayed on an operation panel at initial start-up of the printer.

After start-up, the control section 119 of the printer 110 causes the operation panel 113 to display a start-up screen image IM1 as illustrated in FIG. 9A.

Figure 9B:
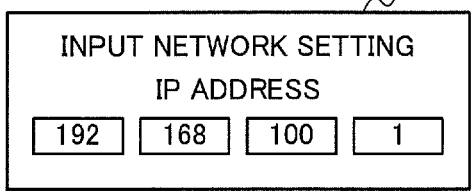

In step S40 of the flowchart shown in FIG. 8, if it is determined that the start-up is the first time, the control section 119 causes the operation panel 113 to display an IP address setting screen image IM2 as illustrated in FIG. 9B, in order to receive an input of an IP address.

Figure 9C:
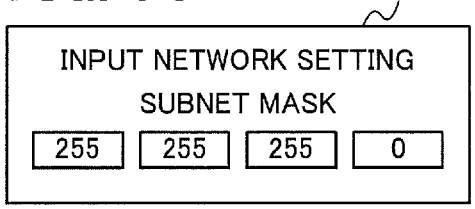

When the IP address is input, the control section 119 causes the operation panel 113 to display a subnet mask setting screen image IM3 as illustrated in FIG. 9C, in order to receive an input of a subnet mask.

Figure 9D:
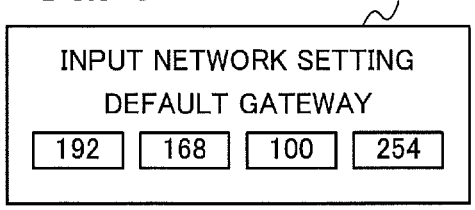

When the subnet mask is input, the control section 119 causes the operation panel 113 to display a default gateway setting screen image IM4 as illustrated in FIG. 9D, in order to receive an input of a default gateway.

Figure 9E:
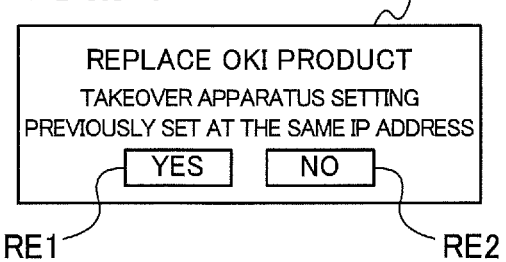

Through the foregoing screen images IM2 through IM4, when a network setting is completed, the control section 119 causes the operation panel 113 to display a setting takeover selection screen image IM5 as illustrated in FIG. 9E, in order to inquire about whether to execute a setting takeover process or not.

Figure 9F:
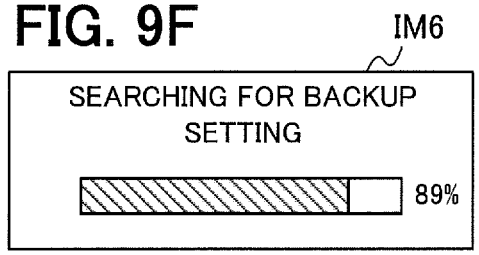

In the setting takeover selection screen image IM5, if an input for selecting a region RE1 indicating "YES" for instructing takeover of setting values (i.e., execution of a setting takeover process) is performed, the control section 119 causes the operation panel 113 to display a search screen image IM6 of a BSF 104 as illustrated in FIG. 9F, in order to indicate execution of a search for a corresponding BSF.

Figure 9G:
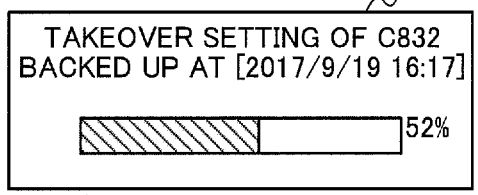
Figure 9H:
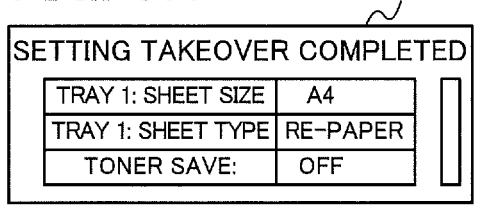
Figure 9I:
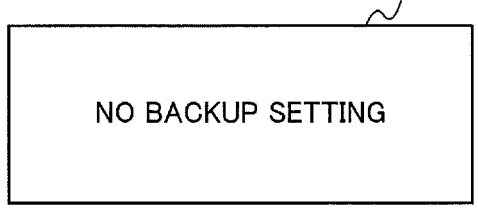
Figure 9J:
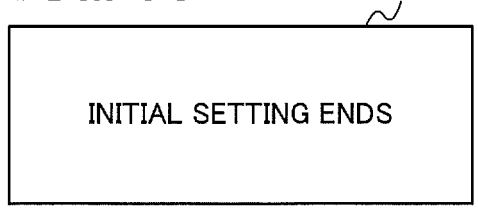

On the other hand, in the setting takeover selection screen image IM5, if an input for selecting a region RE2 indicating "NO" for instructing not to take over setting values (non-execution of a setting takeover process) is performed, the control section 119 causes the operation panel 113 to display an initial setting end screen image IM10 as illustrated in FIG. 9J, in order to indicate an end of the initial setting, and then ends the start-up process.

If the corresponding BSF 104 is successfully detected as a result of the search for the corresponding BSF 104, the control section 119 causes the operation panel 113 to display a takeover in-process screen image IM7 as illustrated in FIG. 9G, in order to indicate takeover of the setting values from the corresponding BSF.

On the other hand, if the corresponding BSF 104 was not detected as a result of the search for the corresponding BSF 104, the control section 119 causes the operation panel 113 to display a takeover failure screen image IM9 as illustrated in FIG. 9I, in order to indicate incapability of takeover of the setting value, and then ends the start-up process.

When the takeover process is completed, the control section 119 causes the operation panel 113 to display a takeover completion screen image IM8 as illustrated in FIG. 9H, and then ends the start-up process. In FIG. 9H, 'RE-PAPER' is the abbreviation of 'RECYCLED PAPER'.

Figure 4:
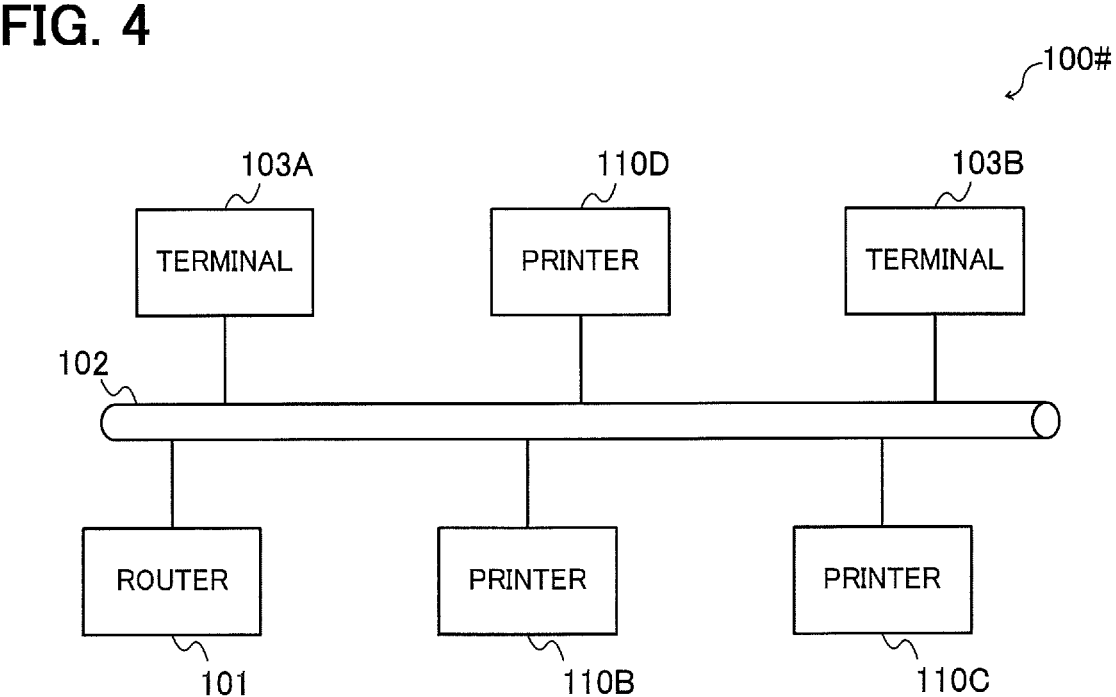
FIG. 4 is a block diagram schematically illustrating a configuration of the backup system after replacing the printer.
Figure 10:
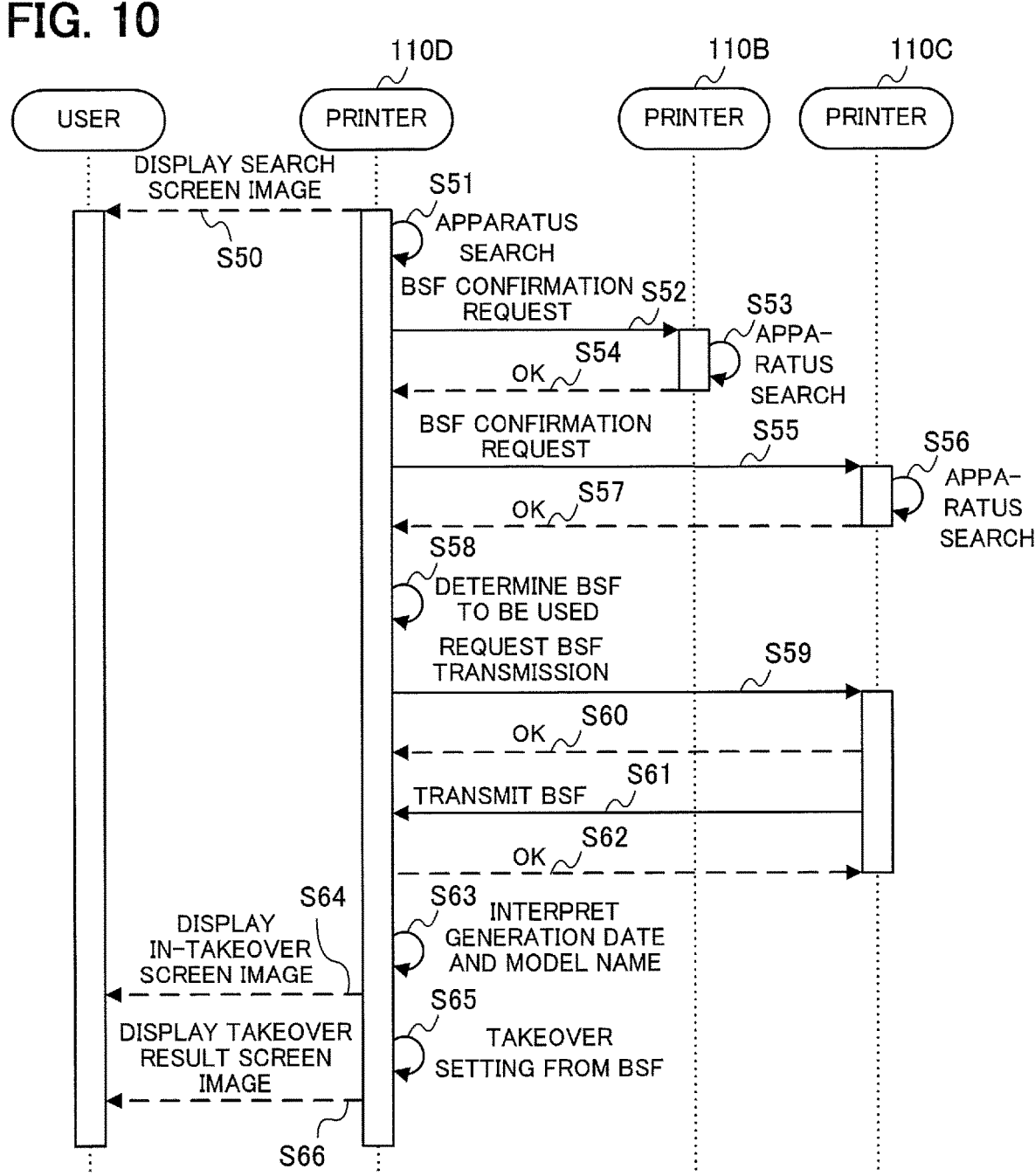
FIG. 10 is a sequence diagram showing a setting acquisition process and a setting takeover process performed by a replaced printer.

FIG. 10 is a sequence diagram showing a setting acquisition process and a setting takeover process performed by the printer 110D in replacing the printer 110A by the printer 110D in the backup system 100 illustrated in FIG. 1, as exemplified by the backup system 100# illustrated in FIG. 4.

First, the backup setting control section 114 of the printer 110D causes the operation panel 113 to display the search screen image IM6 as illustrated in FIG. 9F (S50), and searches the network 102 for the printer 110 that can be backed up, through the network communication section 112 (S51). For example, the backup setting control section 114 causes the network communication section 112 to transmit a predetermined request (e.g., a backup response request) with broadcast, thereby searching for the printer 110 that can be backed up. In the printer 110 that has received such a request, the backup setting control section 114 makes a predetermined response (e.g., a backup response) to the transmission source through the network communication section 112. Here, it is assumed that the printer 110B and the printer 110C respond.

Through the network communication section 112, the backup setting control section 114 of the printer 110D sends to the printer 110B a BSF confirmation request for determining whether the printer 110B holds the BSF 104 or not (S52).

In the printer 110B that has received the BSF confirmation request, the backup setting control section 114 specifies an IP address of the printer 110D based on a source IP address of the BSF confirmation request. Then, the backup setting control section 114 searches the BSFs 104 stored in the storage section 118 for a BSF 104 in which an IP address stored in the row 104e is 192.168.100.1 that is the same as the specified IP address (S53).

If such a BSF 104 is found, the backup setting control section 114 of the printer 110B causes a generation date stored in the row 104c of this BSF 104 to be included in a response indicating "OK" as a search success response and sends the response to the printer 110D through the network communication section 112 (S54).

Similarly, the backup setting control section 114 of the printer 110D sends a BSF confirmation request to the printer 110C through the network communication section 112 (S55).

In the printer 110C that has received the BSF confirmation request, the backup setting control section 114 searches for a BSF 104 storing an IP address corresponding to a source IP address of the BSF confirmation request (S56), and sends a response indicating OK and including the generation date of this BSF 104 to the printer 110D through the network communication section 112 (S57).

Here, in step S54, the printer 110B sends a generation date "2017/9/12 13:17" as a response, and the printer 110C sends a generation date "2017/9/19 16:17" as a response.

The backup setting determination section 116 of the printer 110D determines a BSF 104 of the printer 110C that is the latest. BSF 104 in the responded generation date, as a BSF 104 to be used for takeover of setting values (S58).

Then, the backup setting control section 114 of the printer 110D sends a transmission request of the BSF 104 to the printer 110C through the network communication section 112 (S59).

The printer 110C that has received the transmission request for a BSF 104, the backup setting control section 114 is in a transmittable state, and thus, sends a response indicating OK as a success response indicating that the printer 110C accepts the transmission request for a BSF 104 to the printer 110D through the network communication section 112 (S60).

Thereafter, the backup setting control section 114 of the printer 110D transmits the BSF 104 stored in the storage section 118 to the printer 110D (S61). The BSF 104 transmitted here is the BSF 104 found at step S56, and is the BSF 104 generated in the printer 110A in this example.

The backup setting control section 114 of the printer 110C causes the storage section 118 to store the BSF 104 received from the printer 110C, and sends a response indicating OK as a success response indicating a success in receiving the BSF 104 to the printer 110C through the network communication section 112 (S62).

Subsequently, the backup setting update section 117 of the printer 110D interprets values stored in the first two rows of the BSF 104 stored in the storage section 118 and acquires a generation date and a model name of this BSF 104 (S63). The control section 119 are notified of the acquired generation date and model name.

The control section 119 causes the operation panel 113 to display the takeover in-process screen image IM7 as illustrated in FIG. 9G by using the generation date and the model name acquired in step S63 (S64).

The backup setting update section 117 translates the BSF 104 stored in the storage section 118, and performs a setting takeover process of taking over the setting values stored in the BSF 104 to the apparatus setting information stored in the storage section 118 (S65).

When the setting takeover process is completed, the backup setting update section 117 notifies the control section 119 of this completion, and the control section 119 causes the operation panel 113 to display the takeover completion screen image IM8 as illustrated in FIG. 9H (S66).

If a failure response indicating a failure in finding the BSF 104 is sent in steps S54 and S57, the control section 119 causes the operation panel 113 to display the takeover failure screen image IM9 as illustrated in FIG. 9I, and finishes the process.

Figure 11:
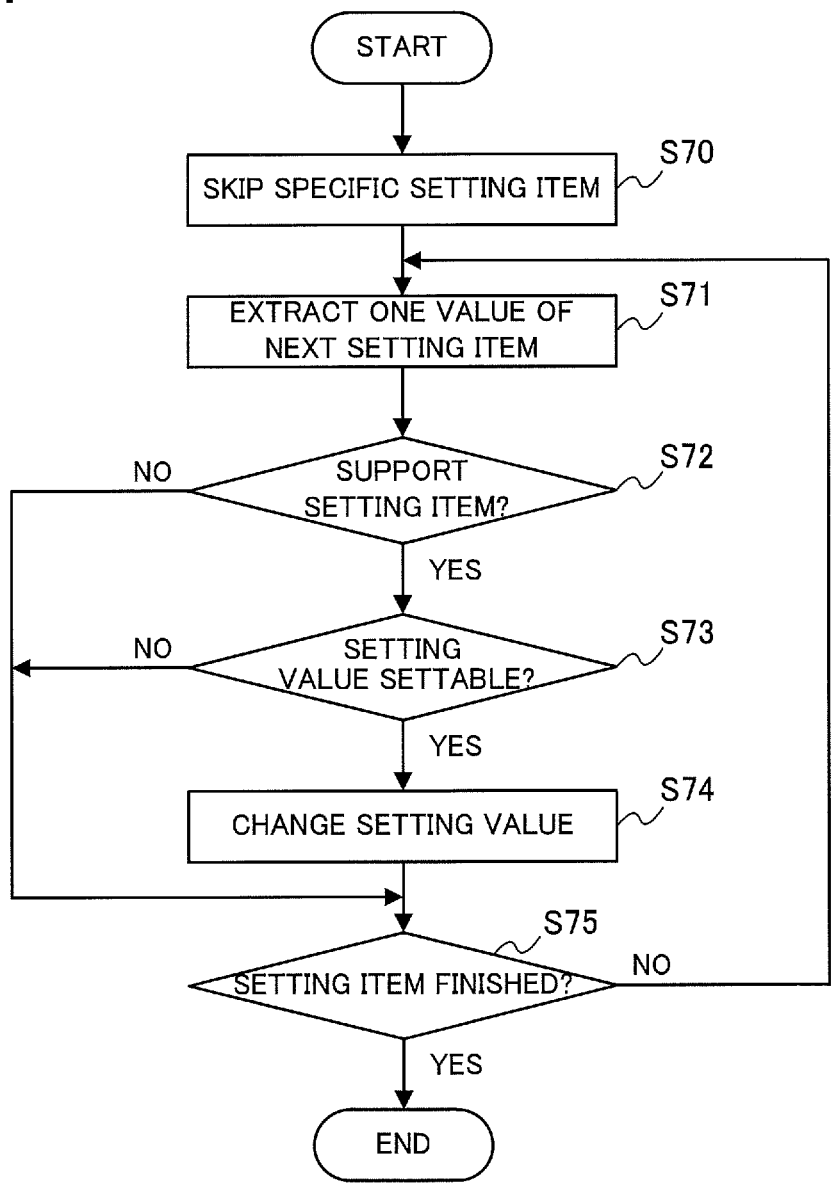
FIG. 11 is a flowchart depicting a setting takeover process by a backup setting updating section.

FIG. 11 is a flowchart depicting a setting takeover process by the backup setting updating section 117.

The backup setting update section 117 reads out a BSF 104 that includes an IP address of its own apparatus and has been acquired from another printer 110, from the storage section 110, and skips the row 104c to the row 104f in this BSF 104 (S70). Then, the backup setting update section 117 sequentially reads out one setting item at a time from the row 104g next to the row 104f in the row order (S71).

The backup setting update section 117 refers to the apparatus setting information stored in the storage section 118, to determine whether the read setting item is supported in its own printer 110 or not (S72). If the setting item is supported (Yes in S72), the process proceeds to step S73. If the setting item is not supported (No in S72), the process proceeds to step S75.

In step S73, the backup setting update section 117 determines whether the setting value in the BSF 104 corresponding to the setting items read out in step S71 can be set in its own printer 110 or not. If the setting value can be set (Yes in S73), the process proceeds to step S74. If the setting value cannot be set (No in S73), the process proceeds to step S75.

In step S74, the backup setting update section 117 replaces the corresponding setting value of the apparatus setting information stored in the storage section 118 with the setting value read out in step S71.

In step S75, the backup setting update section 117 determines whether the setting values of all the setting items in the BSF 104 have been read out or not. If the setting values of all the setting items have been read out (Yes in S75), the process is finished. If the setting values of all the setting items have not been read out (No in S75), the process returns to step S71.

FIGS. 12A and 12B are schematic diagrams showing apparatus setting information before and after takeover of setting values using the BSF 104 illustrated in FIG. 7 in the printer 110C. FIG. 12A shows apparatus setting information before the takeover, and FIG. 12B shows apparatus setting information after the takeover.

As illustrated in FIG. 7, a setting value corresponding to a setting item of "tray 1: sheet size" in the BSF 104 is "A4" (row 104g). As illustrated in FIG. 12A, since the initial value of the setting item of "tray 1: sheet size" of the printer 110C is also "A4", the setting value does not change after takeover, as illustrated in FIG. 12B.

The setting value corresponding to the setting item "tray 1: sheet type" in the BSF 104 is "recycled paper" (row 104h). As illustrated in FIG. 12A, since the initial value of the setting item "tray 1: sheet type" of the printer 110C is "plain paper", the setting value is changed to "plain paper" after takeover, as illustrated in FIG. 12B.

The setting value corresponding to the setting item "tray 2: sheet size" in the BSF 104 is "A3" and the setting value corresponding to the setting item "tray 2: sheet type" is "plain paper". However, since the printer 110C does not include the tray 2, these setting values are ignored.

The setting value corresponding to the setting item "toner save" in the BSF 104 is "middle" (row 104k). As illustrated in FIG. 12A, the initial value of the setting item "toner save" in the printer 110C is "OFF", but any one of "ON" and "OFF" can be set as the setting item of toner save in the printer 110D. Thus, this setting value is ignored, and as illustrated in FIG. 12B, the setting value of the printer 110D remains "OFF".

As described above, in this embodiment, a setting value is automatically backed up in each of the plurality of printers 110, and can be taken over among the printers 110 in replacing the printers 110 without using an in-house server or a cloud server.

The foregoing embodiment has been directed to the printers 110 as an example, but this embodiment is not limited to the printers 110 and is also applicable to other image forming apparatuses such as facsimiles, copying machines, and MFPs.

In the foregoing embodiment, the BSF 104 is transmitted to another printer 110 at every seven days, but this embodiment is not limited to such an example. The BSF 104 only needs to be transmitted every after a lapse of a predetermined period.

The BSF 104 may be transmitted to another printer at every change of setting values.

REFERENCE MARKS IN THE DRAWINGS 100 backup system, 102 network, 110 printer, 111 print section, 112 network communication section, 113 operation panel, 114 backup setting control section, 115 backup setting generation section, 116 backup setting determination section, 117 backup setting update section, 118 storage section, 119 control section.

What is claimed is:

1. An image forming apparatus connected to a network to which another image forming apparatus is connected, the image forming apparatus comprising:
   a network communication section that communicates with the another image forming apparatus via the network;
   a storage section that stores apparatus setting information including a plurality of setting values corresponding to a plurality of setting items in the image forming apparatus;
   a backup setting generation section that extracts a first setting value corresponding to a first setting item from the apparatus setting information, and generates a first backup setting file including the first setting value and first identification information assigned to the image forming apparatus in the network, the first setting value being associated with the first identification information in the first backup setting file;
   a backup setting control section that sends a predetermined request by broadcast through the network communication section, sends, through the network communication section, the first backup setting file to the another image forming apparatus that has responded to the predetermined request, and receives, through the network communication section, the first backup setting file including the first identification information from the another image forming apparatus that has responded to the predetermined request; and a backup setting update section that specifies the first setting value from the received first backup setting file, and updates a second setting value corresponding to the first setting value in the plurality of setting values included in the apparatus setting information to the first setting value.

2. The image forming apparatus according to claim 1, wherein the backup setting generation section generates the first backup setting file every after a lapse of a predetermined period.

3. The image forming apparatus according to claim 1, wherein the backup setting generation section generates the first backup setting file each time any one of the plurality of setting values included in the apparatus setting information is changed.

4. The image forming apparatus according to claim 1, wherein in a case where the backup setting control section receives a second backup setting file including second identification information assigned to the another image forming apparatus in the network through the network communication section, the backup setting control section causes the storage section to store the second backup setting file.

5. The image forming apparatus according to claim 1, wherein
a plurality of other image forming apparatuses including the another image forming apparatus connected to the network, and
in a case where the backup setting control section receives a second backup setting file including second identification information assigned to each of the plurality of other image forming apparatuses in the network through the network communication section, the backup setting control section causes the storage section to store the second backup setting file.

6. The image forming apparatus according to claim 5, wherein
the second backup setting file includes a generation date of the second backup setting file, and
in a case where the backup setting control section receives, from one image forming apparatus of the plurality of other image forming apparatuses, a confirmation request including the second identification information assigned to the one image forming apparatus through the network communication section, the backup setting control section searches the storage section to obtain the second backup setting file including the second identification information assigned to the one image forming apparatus, and sends the generation date included in the obtained second backup setting file through the network communication section as a response to the one image forming apparatus.

7. The image forming apparatus according to claim 4, wherein the second identification information is an internet protocol (IP) address.

8. The image forming apparatus according to claim 1, further comprising a backup setting determination section, wherein
a plurality of other image forming apparatuses including the another image forming apparatus are connected to the network,
the first backup setting file includes a generation date of the first backup setting file, the backup setting control section sends a confirmation request including the first identification information to each of the plurality of other image forming apparatuses through the network communication section, thereby receiving the generation date included in the first backup setting file from each of the plurality of other image forming apparatuses through the network communication section, the backup setting determination section determines, as a backup setting file to be used, the first backup setting file including a latest generation date of the plurality of generation dates received from the plurality of other image forming apparatuses, and the backup setting control section receives the backup setting file to be used from one of the plurality of other image forming apparatuses through the network communication section.

9. The image forming apparatus according to claim 1, wherein the backup setting update section specifies, from the first backup setting file, a setting value that is able to be set for the setting item in the image forming apparatus, the setting value corresponding to one of the plurality of setting items included in the apparatus setting information.

10. The image forming apparatus according to claim 1, wherein the first identification information is an internet protocol (IP) address.

11. The image forming apparatus according to claim 1, wherein, in a case where start-up information is not stored in the storage section, the backup setting control section sends the predetermined request, and receives the first backup setting file.

12. The image forming apparatus according to claim 1, wherein
a plurality of other image forming apparatuses including the another image forming apparatus are connected to the network;
in a case where start-up information is not stored in the storage section, the backup setting control section sends the predetermined request; and
in a case where two or more image forming apparatuses including the another image forming apparatus have responded to the predetermined request, the backup setting control section sends the first backup setting file to the two or more image forming apparatuses, the two or more image forming apparatuses being included in the plurality of other image forming apparatuses.

13. The image forming apparatus according to claim 1, wherein
a plurality of other image forming apparatuses including the another image forming apparatus are connected to the network;
in a case where start-up information is not stored in the storage section, the backup setting control section sends the predetermined request;
in a case where two or more image forming apparatuses including the another image forming apparatus have responded to the predetermined request, the backup setting control section sends another predetermined request to the two or more image forming apparatuses through the network communication section, the two or more image forming apparatuses being included in the plurality of other image forming apparatuses; and
the backup setting control section selects, as the another image forming apparatus, an image forming apparatus that has sent a latest generation date as a response to the another predetermined request of the two or more image forming apparatuses, and receives the first backup setting file from the selected image forming apparatus.

14. An image forming apparatus connected to a network to which another image forming apparatus is connected, the image forming apparatus comprising:
    a network communication section that communicates with the network;
    a storage section that stores apparatus setting information in the image forming apparatus, the apparatus setting information including a first setting value corresponding to a first setting item and a second setting value corresponding to a second item;
    a backup setting generation section that extracts a setting value corresponding to a predetermined setting item from the apparatus setting information, and generates a first backup setting file including the extracted setting value and first identification information assigned to the image forming apparatus in the network, the extracted setting value being associated with the first identification information in the first backup setting file;
    a backup setting control section that sends a predetermined request by broadcast through the network communication section, sends, through the network communication section, the first backup setting file to the another image forming apparatus that has responded to the predetermined request, and receives, through the network communication section, a first backup setting file including the first identification information from the another image forming apparatus that has responded to the predetermined request; and
    a backup setting update section that specifies a setting value that is able to be set in the image forming apparatus from the received first backup setting file, and updates a setting value corresponding to the specified setting value in the plurality of setting values included in the apparatus setting information to the specified setting value.

15. A backup system including a plurality of image forming apparatuses connected to a network, wherein
    each of the plurality of image forming apparatuses comprises:
    a network communication section that communicates with another image forming apparatus via the network;
    a storage section that stores apparatus setting information including a plurality of setting values corresponding to a plurality of setting items in its own image forming apparatus;
    a backup setting generation section that extracts a first setting value corresponding to a first setting item from the apparatus setting information, and generates a first backup setting file including the first setting value and first identification information assigned to its own image forming apparatus in the network, the extracted setting value being associated with the first identification information in the first backup setting file;
    a backup setting control section that sends a predetermined request by broadcast through the network communication section, sends, through the network communication section, the first backup setting file to the another image forming apparatus that has responded to the predetermined request, and receives, through the network communication section, the first backup setting file including the first identification information from the another image forming apparatus that has responded to the predetermined request; and
    a backup setting update section that specifies the first setting value from the received first backup setting file, and updates a second setting value corresponding to the first setting value in the plurality of setting values included in the apparatus setting information to the first setting value.

* * * * *